Figure 1:
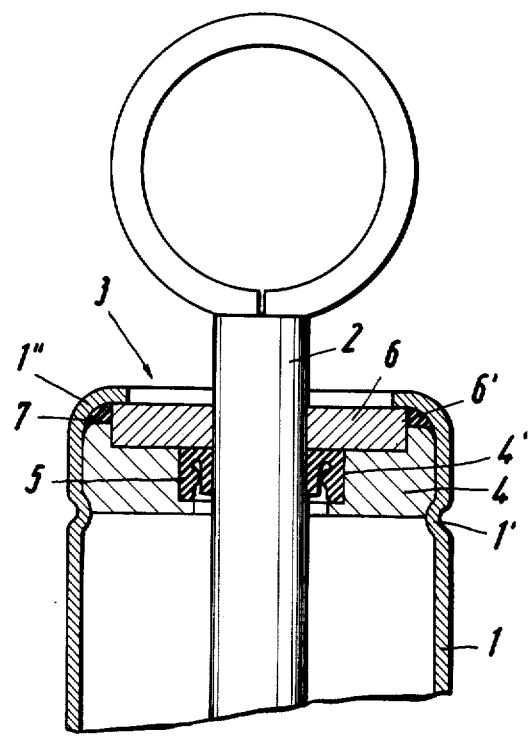

United States Patent [19]

de Baan

[11] 3,927,871
[45] Dec. 23, 1975

[54] COVER PLATE FOR CYLINDERS HAVING SEALED PISTON ROD GUIDES

[75] Inventor: Johannes J. de Baan, Ennepetal-Ruggeberg, Germany

[73] Assignee: Firma August Bilstein, Ennepetal, Germany

[22] Filed: Oct. 4, 1974

[21] Appl. No.: 511,736

[30] Foreign Application Priority Data
Oct. 12, 1973  Germany............................ 2351309

[52] U.S. Cl................................. 267/65 R; 308/3.5
[51] Int. Cl.²............................................ F16F 5/00
[58] Field of Search..................... 267/65 R; 308/3.5

[56] References Cited
UNITED STATES PATENTS

| | | |
|---|---|---|
| 2,778,695 | 1/1957 | Sturtevant............................ 308/3.5 |
| 2,808,277 | 10/1957 | Binder .................................. 308/3.5 |
| 3,307,883 | 3/1967 | Wustenhagen et al............ 267/65 R |
| 3,850,483 | 11/1974 | Roberts et al. ...................... 308/3.5 |

Primary Examiner—James B. Marbert
Attorney, Agent, or Firm—Neuman, Williams, Anderson & Olson

[57] ABSTRACT

A cover plate assembly particularly adapted for use in hydropneumatic shock absorbers in which a piston reciprocally moves in a cylinder containing, pressurized gas and a damping liquid is provided. The assembly comprises a high-temperature resisting plastic disc supported on an inwardly disposed annular projection formed on the cylinder wall which projection is disposed adjacent the cylinder end traversed by a piston-actuating rod. A sealing element engaging the piston rod is nestably received in the plastic ring. An overlying metal disc is also traversed by the piston rod, reinforces the plastic disc against bending and serves as a piston rod guide. The metal disc may also be nestably received in a central bore portion of the contiguous plastic disc. The adjacent cylinder end is rolled over the metal disc to clamp the cover elements against the underlying annular projection. A deformable sealing ring engaged by the metal ring and plastic disc is deformed into sealing relation with the cylinder end as such end is deformed and rolled over the metal disc.

7 Claims, 2 Drawing Figures

COVER PLATE FOR CYLINDERS HAVING SEALED PISTON ROD GUIDES

FIELD OF THE INVENTION

This invention relates to a cylinder cover plate assembly having a guide seal for a piston rod. The provided cover plate is particularly adapted for use in hydropneumatic shock absorbers, and in one embodiment comprises an assembly of an annular inner disc supported on an annular projection of the cylinder inner wall, an outwardly disposed sealing ring abutting a cylinder end wall portion, a sealing element engaging the piston rod by means of a packing washer portion and an annular outer metal disc which forms the piston rod guide and abuts an end portion of the cylinder wall.

BACKGROUND OF THE INVENTION

Known cover plates of the type mentioned above, which are particularly adapted for use with shock absorbers containing pressurized gas consist primarily of three annular discs placed one above the other and clamped between projections on the cylinder wall. In these cover plates of the prior art, the innermost disc and the outermost disc consist of metal while the intermediate disc consists of elastic material, normally rubber or the like. The outer circumference of the intermediate rubber disc engages the cylinder wall where it forms a seal with the inner cylinder wall.

Into the bore of the rubber disc that surrounds the piston rod with a clearance, there is placed a sealing ring whose packing washer engages the piston rod and which can consist of Vulcollan. The suggestion has also been made to manufacture such sealing rings of polyethylene tetrafluoride. The projections on the cylinder wall, which hold such multiple-disc cover plate packs together are either formed by spring rings inserted into corresponding annular grooves or corrugations. The interior projections are worked into the cylinder wall while the cylinder ends receiving the piston are then formed mainly by a corresponding rolling of the cylinder end.

Thus it is characteristic of these known cylinder cover plate assemblies to employ at least three annular discs lying in stacked relation, one above the other. Such stacked discs occasion considerable expense both for material of composition and production. Such a stacked multiple-disc cover plate assembly necessitates consumption of receiving space in the cylinder where located. Such space occupied by the discs is at the expense of the effective piston rod stroke length in the shock absorber cylinder. Finally, on known cylinder cover plates of the prior art the sealing action at the piston rod as well as at the cylinder wall leaves much to be desired.

This invention is, therefore, directed to the problem of developing a cylinder cover plate construction which is especially intended for use in hydropneumatic shock absorbers.

It is an object of this invention to provide a cylinder cover assembly which is compact and can be produced at an extraordinarily reasonable price.

It is another object of this invention to provide a cylinder cover plate assembly which is mounted very easily and in addition provides a durable, highly effective sealing of the cylinder which is partly filled with shock absorbing fluid and pressurized gas.

Utilizing a cover plate of the type mentioned above, the problems referred to are solved in the provided invention by a plate assembly in which an annular innermost disc which carries a rod-engaging sealing element in a central bore, consists of a temperature-resistant synthetic material and abuts against an overlying outer disc disposed in reinforcing relation. Mounted over the outer disc in an annular exterior sealing element clamped between the outer disc, the plastic inner disc and a cylinder end wall portion.

Such a construction provides a very simply constructed and economical, sealed, hydropneumatic shock absorber which consists predominantly of the inner plastic disc which carries the sealing element and which is reinforced against deformation by the outer disc. This reinforcement is necessary since even high-temperature-resistant synthetic materials alone are not sufficiently able to absorb, without bending, the great inside pressures developed in the shock absorber cylinder of up to 100 atmospheres and heat up to 160° C which conditions occur in connection with use of such pressurized gas shock absorbers. Therefore, the plastic disc which otherwise would arch outwardly is kept free of such bending moments by means of the outer, preferably metal, disc which abuts directly and reinforces the plastic disc, and is thus only under pressure stress without any possibility of failing by bending outwardly. At the the same time it is made certain that the outer metal disc may be thin and only as big as is absolutely necessary for its function. This again emphasizes the fact that the cylinder cover plate assembly comprises mainly the plastic disc which occupies by far the largest material volume in the shock absorber cylinder.

In accordance with a further characteristic of the invention the plastic disc is preferably provided with a supporting flange which extends inwardly beneath the sealing element which is inserted in the piston-rod-passage bore of the plastic disc; such sealing element-supporting flange can be easily formed during the manufacture of the plastic discs. Thereby the inner sealing element is fixed and axially immovable. This sealing element has a U-shaped radial transverse section whose outer "U" side abuts on the bore wall of the receiving plastic disc provided with a supporting flange, and whose inner "U" side abuts on the piston rod like a packing washer, while the connecting bridge of the U-profiled sealing element abuts the outer metal disc.

As a result, the inner central portion of the sealing element readily adapts and conforms to the piston rod, thus effecting a desired seal. In order to achieve an additional pressing effect, the outer side of the U-profiled sealing element can be provided with an annular protuberance which in the compressed inserted state of the sealing element presses against the packing washer-like interior side of said ring.

Finally, the cover assembly of this invention includes an outer metal disc disposed outwardly of the cylinder interior imbedded in and nestably received in the thicker plastic disc. The metal disc outer edge circumference protruding beyond the receiving surface of said plastic disc is encompassed by the outer sealing ring, which itself is encompassed by the rolled-in end of the shock absorber cylinder. The edge of the rolled-in end extends beyond the edge periphery of the outwardly disposed metal disc and is thereby encompassed with a corresponding outer rounding thereof. By means of the foregoing assembly one achieves an especially compact design of the cover plate assembly with extraordinary mounting possibility and with especially effective exterior sealing.

Figure 2:
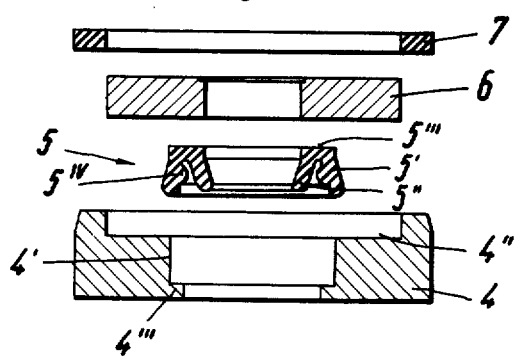

Further characteristics as defined in the invention shall be described by means of the embodiment shown in the drawing wherein there is shown in FIG. 1 a longitudinal sectional view of the cylinder end of a hydropneumatic one-tube shock absorber containing the cover plate assembly with the piston rod passing therethrough, and in FIG. 2 the individual parts of the provided cylinder cover plate assembly are illustrated in an exploded view prior to being assembled into the relationship of FIG. 1.

DESCRIPTION OF THE INVENTION

Illustrated cylinder 1 partly filled with shock absorbing liquid and pressurized gas of a one-tube shock absorber is closed tightly at the illustrated end of FIG. 1 which engages by means of the cover plate assembly generally marked 3, a piston rod 2 which passes therethrough. The cover plate 3 also forms a sealed guide for the piston rod 2 at this location.

The cover plate 3 comprises a plastic disc 4 which is provided with a sealing element 5 inserted into a piston rod passage bore 4'. The disc 4 can consist of different types of high temperature-resistant or hard synthetic material, such as Hostadur, Nylatron or the like, whereas the sealing element 5 consists preferably of Perbunan or Viton. The plastic disc 4 abuts directly against an outer, overlying annular metal disc 6 which reinforces the plastic disc 4 and keeps it free of bending stresses. The metal disc 6 is partly imbedded in the plastic disc 4 in its recess 4" more clearly seen in FIG. 2. The outer disc 6 disposed outwardly of the cylinder interior is surrounded on its peripheral edge portion 6' which protrudes beyond the plastic disc by a deformable sealing ring 7 which forms the outer seal relative to the cylinder wall and may be formed of rubber or a suitable deformable synthetic material.

The sealing element 5 which is inserted in the bore 4' of the plastic disc 4 has a U-shaped sectional profile whose outer side 5' abuts on the bore wall 4' of the plastic disc 4 which is also provided with an inwardly projecting supporting flange 4''' whereas inner side 5'' of the sealing element U-shaped section abuts the piston rod 2 like a packing washer. Bridge portion 5''' of the sealing element 5 engages the outer disc 6; portion 5''' thus joins the concentric ring members defining the walls 5' and 5'' of the ring.

In the course of installing the cover plate assembly in the shock absorber cylinder 1, the plastic disc 4 with the sealing element 5 inserted in its central bore is first pushed against corrugation 1' which forms an inwardly protruding projection in the cylinder wall. The corrugation 1' thus provides an annular support for the disc 4. Subsequently, after the insertion of the outer metal disc 6 and the outer sealing ring 7, the cylinder end 1" is deformed inwardly to such a degree that it extends over the edge of the outside disc 6 as illustrated in FIG. 1. Thus not only the entire cover plate assembly 3 is firmly compressed between the cylinder corrugation 1' and the rolled-in cylinder end 1", but simultaneously the outer sealing ring 7 with a rounded outside surface corresponding to the rolled-in deformed cylinder end 1" is pressed flat so that a highly effective outer seal results. Furthermore, the sealing element 5 by means of its side 5" abuts against the piston rod 2 like a packing washer. In order to assist the compression of packing ring portion 5", element 5 is provided on its outer side 5' with a roll 5^{IV} which additionally presses the packing washer or the inner side 5" against the piston rod. The support flange 4''' which is provided on the plastic disc 4 and which is to be slightly pointed when said disc 4 is manufactured, prevents the sealing element 5 from slipping out of the bore 4' of the plastic disc 4.

The plastic disc 4 which forms the main element of the cylinder cover plate assembly has the function of forming a stop face at its lower surface for the underlying piston (which is not shown). Also the disc 4 functions as a holder for the piston rod sealing element 5. In addition, by means of the plastic disc 4, the outside sealing ring 7 is centered by virtue of the nesting relation and finally the possibility to fasten the entire cover plate is guaranteed. On the other hand, the annular outside metal disc 6 is primarily intended to protect the disc 4 against arching or warping and simultaneously to form a piston rod guide in the course of rod reciprocal movement. Furthermore, the outer metal disc 6 serves to function as an axial stop of the inside sealing element 5 as well as to support the outside sealing ring 7 and to support or clamp the entire cover plate assembly against the rolled-in cylinder end 1" of the shock absorber.

The special advantages of the new cover plate assembly are due to the fact that it is mainly made of plastic, can be produced at an extraordinarly low cost, and because of its simple construction it can be mounted easily and saves space. Beyond this, it forms a highly effective durable seal on the piston rod as well as at the end wall of the cylinder.

I claim:

1. In a cover plate assembly particularly adapted for use in a hydropneumatic shock absorber, the combination comprising a cylinder having a reciprocally movable piston rod extending therefrom in fluid sealing relation and having an inwardly projecting support disposed on an inner peripheral wall portion; an inner temperature-resistant plastic disc supported on such support in said cylinder; a sealing element traversed by said piston rod and received in a central bore portion in said inner disc; an outer metal disc contiguous with a face portion of said inner disc and a face of said sealing element adapted to guide said piston rod and reinforce said plastic disc against bending forces in the normal course of piston rod movement; an outer, deformable annular sealing ring concentric with said piston rod and metal disc and supportingly disposed on an annular portion of said inner plastic disc; said supporting annular portion of said inner plastic disc initially being of lesser area than the surface of the outer annular sealing ring supported thereon; an inwardly projecting edge portion of said cylinder overlying peripheral portions of said metal disc; said outer sealing ring being urged by said cylinder edge portion against the outer periphery of said outer metal disc and the supporting annular portion of said inner plastic disc so as to be deformed and fill the annular volume defined by said inner plastic disc, said outer metal disc and the inwardly projecting cylinder edge portion; the interval between said inwardly projecting edge portion and said cylinder projecting support being such that said metal disc, sealing ring and inner plastic disc are urged into a close-packed, substantially fluid-tight relation.

2. The cover plate assembly as defined in claim 1 in which the plastic disc has three concentric bores, an innermost bore of smallest diameter receiving the piston traversing said plastic disc, the bore of intermediate diameter receiving said sealing element and the bore of the largest diameter receiving said outer metal disc in interfitting relation.

3. The cover plate assembly of claim 1 in which said inner plastic disc is of synthetic plastic composition resistant to high temperatures.

4. The cover plate assembly of claim 1 in which the central bore of said plastic disc has an inwardly projecting annular flange portion on which said sealing element is seated.

5. The cover plate assembly of claim 1 in which said sealing element is substantially U-shaped in transverse radial section, the outer sealing element U-side abutting the wall portion of said plastic disc defining said central bore, the inner sealing element U-side abutting the piston rod traversing the same and functioning as a packing washer.

6. The cover plate assembly of claim 5 in which the outer U-side of the sealing element has an inwardly disposed protuberance which in the compressed state of the sealing element presses against the inner U-side of said sealing element like a packing washer.

7. The cover plate assembly as defined in claim 1 in which said outer metal disc is embedded in the plastic disc which is thicker, and the metal disc peripheral edge portion projecting from the plastic disc is surrounded by the outer sealing ring.

* * * * *